(12) United States Patent
Tho

(10) Patent No.: US 8,979,214 B2
(45) Date of Patent: Mar. 17, 2015

(54) SECURING DEVICE FOR SPOKES

(75) Inventor: Kee Ping Tho, Jiangsu (CN)

(73) Assignee: Kunshan Henry Metal Technology Co., Ltd., Jiangsu (CN)

( * ) Notice: Subject to any disclaimer, the term of this patent is extended or adjusted under 35 U.S.C. 154(b) by 156 days.

(21) Appl. No.: 13/103,172

(22) Filed: May 9, 2011

(65) Prior Publication Data

US 2012/0235464 A1    Sep. 20, 2012

(30) Foreign Application Priority Data

Mar. 16, 2011   (TW) ............................. 100204696 U

(51) Int. Cl.
*B60B 1/04* (2006.01)
*B60B 21/06* (2006.01)

(52) U.S. Cl.
CPC .............. *B60B 21/062* (2013.01); *B60B 21/06* (2013.01); *B60Y 2200/13* (2013.01)
USPC ......................................................... 301/58

(58) Field of Classification Search
USPC ....................... 301/55, 58, 61, 104
See application file for complete search history.

(56) References Cited

U.S. PATENT DOCUMENTS

| | | | | |
|---|---|---|---|---|
| 2,778,690 | A * | 1/1957 | Horling, Jr. ..................... 301/58 |
| 4,583,787 | A * | 4/1986 | Michelotti ....................... 301/58 |
| 5,806,935 | A * | 9/1998 | Shermeister .................... 301/58 |
| 6,497,042 | B1 * | 12/2002 | Dietrich ................... 29/894.333 |
| 6,679,563 | B2 * | 1/2004 | Okajima .......................... 301/67 |
| 7,137,671 | B2 * | 11/2006 | Passarotto et al. .............. 301/58 |
| 2001/0005099 | A1 * | 6/2001 | Mercat et al. ................... 301/95 |
| 2005/0253446 | A1 * | 11/2005 | Okajima ......................... 301/58 |
| 2007/0029869 | A1 * | 2/2007 | Senoo ....................... 301/95.104 |
| 2008/0290721 | A1 * | 11/2008 | Wang ............................... 301/58 |
| 2010/0264722 | A1 * | 10/2010 | Teixeira, IV .................... 301/58 |

* cited by examiner

*Primary Examiner* — Kip T Kotter
*Assistant Examiner* — Jean Charleston
(74) *Attorney, Agent, or Firm* — Rosenberg, Klein & Lee

(57) ABSTRACT

A securing device of a rim includes a rim having a connection bridge and two walls extend from the connection bridge. Multiple installation holes are defined through the connection bridge. Multiple spoke units each have a spoke, a first fixing member and a second fixing member, wherein the first fixing member has a first fixing portion which includes inner threads. A second fixing portion and a third fixing portion extend from the first fixing member. The third fixing portion has outer threads. The second fixing member includes a connection portion having inner threads defined which are threadedly connected to the third fixing portion. By the second fixing member, the first fixing member is secured and adjusted. The second and third fixing portions are reinforced.

7 Claims, 4 Drawing Sheets

US 8,979,214 B2

SECURING DEVICE FOR SPOKES

FIELD OF THE INVENTION

The present invention relates to a securing device for spokes, and more particularly, to a securing device for guiding the spokes and firmly securing spokes to the rim.

BACKGROUND OF THE INVENTION

A conventional wheel is composed of a rim, a hub at the center of the rim and spokes connected between the rim and the hub. Each spoke has one end connected to the hub and the other end of the spoke extends through the rim and secured by a securing member.

The conventional rim includes multiple holes and the spokes each have a threaded section which extends through the hole, and the securing member has inner threads is securely connected to the threaded section to secure the spoke. By the spokes, the rim does not deform during use.

When securing the spokes, the spoke is inclined in the hole of the rim, or the hole is inclined for connecting the spoke. The securing way affects the force transmission of the spokes and relates to the performance of the spokes and the rim.

Taiwan Utility Patent No. 099204627 discloses a nut which is a hollow nut with a threaded section defined in the inner periphery of the passage thereof and has a cross-shaped outer appearance. The distal end of the nut includes continuous wave-shaped profile and a spherical portion is formed at the mediate portion of the nut. Multiple recesses are defined in the spherical portion and the front section of the nut is tapered. The nut is located in the hole of the rim and the distal end is threadedly connected to the threaded section of the spoke. The spherical portion is used to adjust the angle of the spoke and the rim and the recesses reinforce the connection.

Taiwan Utility Patent No. 099209270 discloses a rim with an inner rim and an outer rim, wherein the inner rim having walls extending radially therefrom, and the outer rim is fixed to the walls. The inner rim includes multiple holes and each hole has an axis which is inclined relative to the base surface of the inner wall. An opening is defined at the inner rim and located close to the outer rim. The inner rim includes a surface defined along the periphery of the opening and located around the hole. The axis of the hole is perpendicular to the surface.

The first example uses the spherical portion to adjust the angle between the spoke and the rim, and the recesses to secure the connection between the spoke and the rim. The second example provides an opening in the inner rim and the opening is inclined relative to the axis of the hole in the rim. The securing member is perpendicular to the hole so that the securing member is connected to the spoke at an angle. Another securing member can be connected to the spoke to further secure the spoke.

However, for the first example, there is a gap between the spoke and the hole in the rim so that when the wheel is in operation, the spoke shakes and could break or loose at the position where the nut is connected to the spoke. Therefore, the rim is easily deformed due to the loosened or broken spokes. For the second example, the opening is difficult to make and the inclination of the surface is fixed which restricts the position of the securing member. The securing member and the fixing member have the same threading direction which makes the spoke to be loosened easily.

SUMMARY OF THE INVENTION

The present invention relates to a securing device of a rim and comprises a rim having a connection bridge with two walls extending therefrom, and multiple installation holes are defined through the connection bridge. Multiple spoke units each have a spoke, a first fixing member and a second fixing member. Each spoke has a first end connected to a hub and a second end of each spoke has an outer threaded section which extends through the installation hole. The first fixing member has a first fixing portion which includes inner threads. The first fixing portion is threadedly connected to the outer threaded section of the first fixing portion. A second fixing portion and a third fixing portion extend from the first fixing member and located in opposite to the first fixing portion. The third fixing portion has outer threads and a passage is defined through the first, second and third fixing portions, so that the spoke extends through the passage. The second fixing member is mounted to the spoke. A connection portion has inner threads defined in the second fixing member and the connection portion is threadedly connected to the third fixing portion.

The primary object of the present invention is to provide a securing device for connecting spokes to the rim, wherein a first fixing member is located on outside of the rim to threadedly connected to the spoke, and a second fixing member and a third fixing member are located at inside of the rim to further secure and guide the first fixing member.

The second object of the present invention is to provide a securing device for connecting spokes to the rim, wherein the second fixing member reinforces the second and third fixing portions of the first fixing member so as to prevent the spoke from being broken.

The third object of the present invention is to provide a securing device for connecting spokes to the rim, wherein the outer threads of the third fixing portion and the outer threaded section of the spoke have opposite threading directions, so that when the first fixing member is loosened, the second fixing member is secured.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
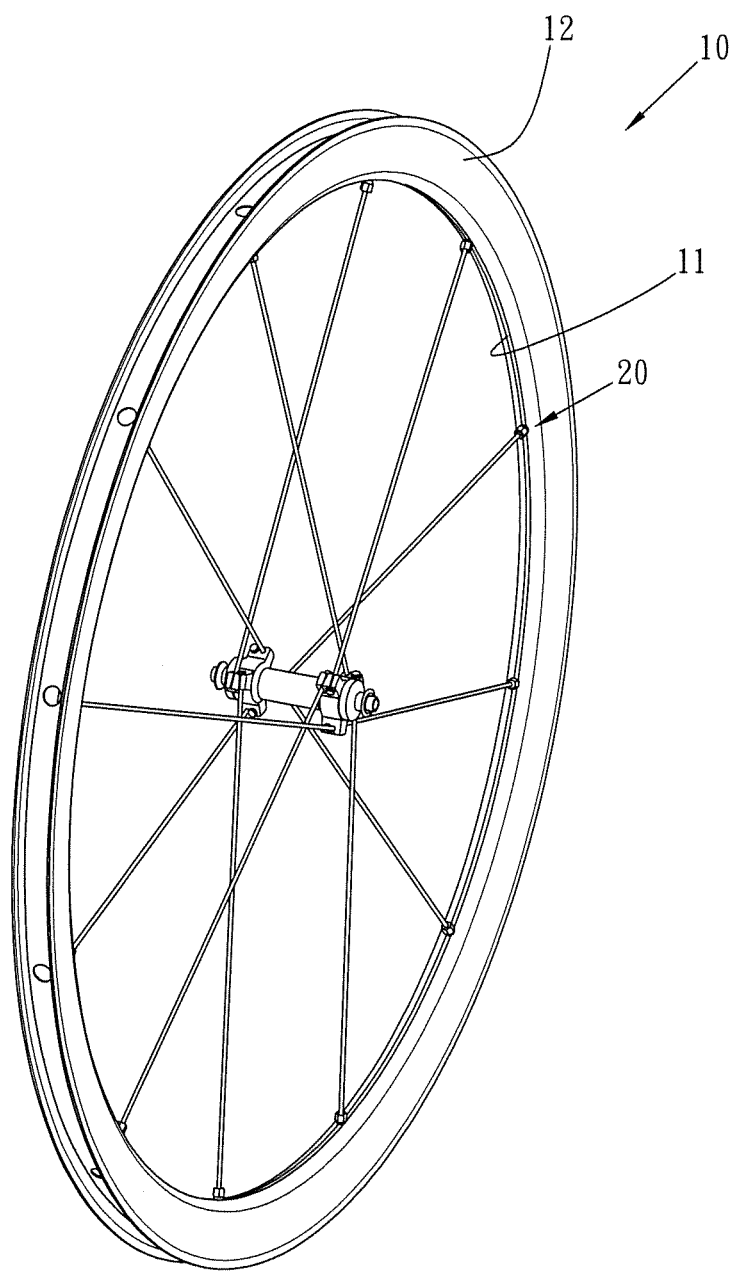
FIG. 1 is an exploded view to show the securing device of the present invention.
Figure 2:
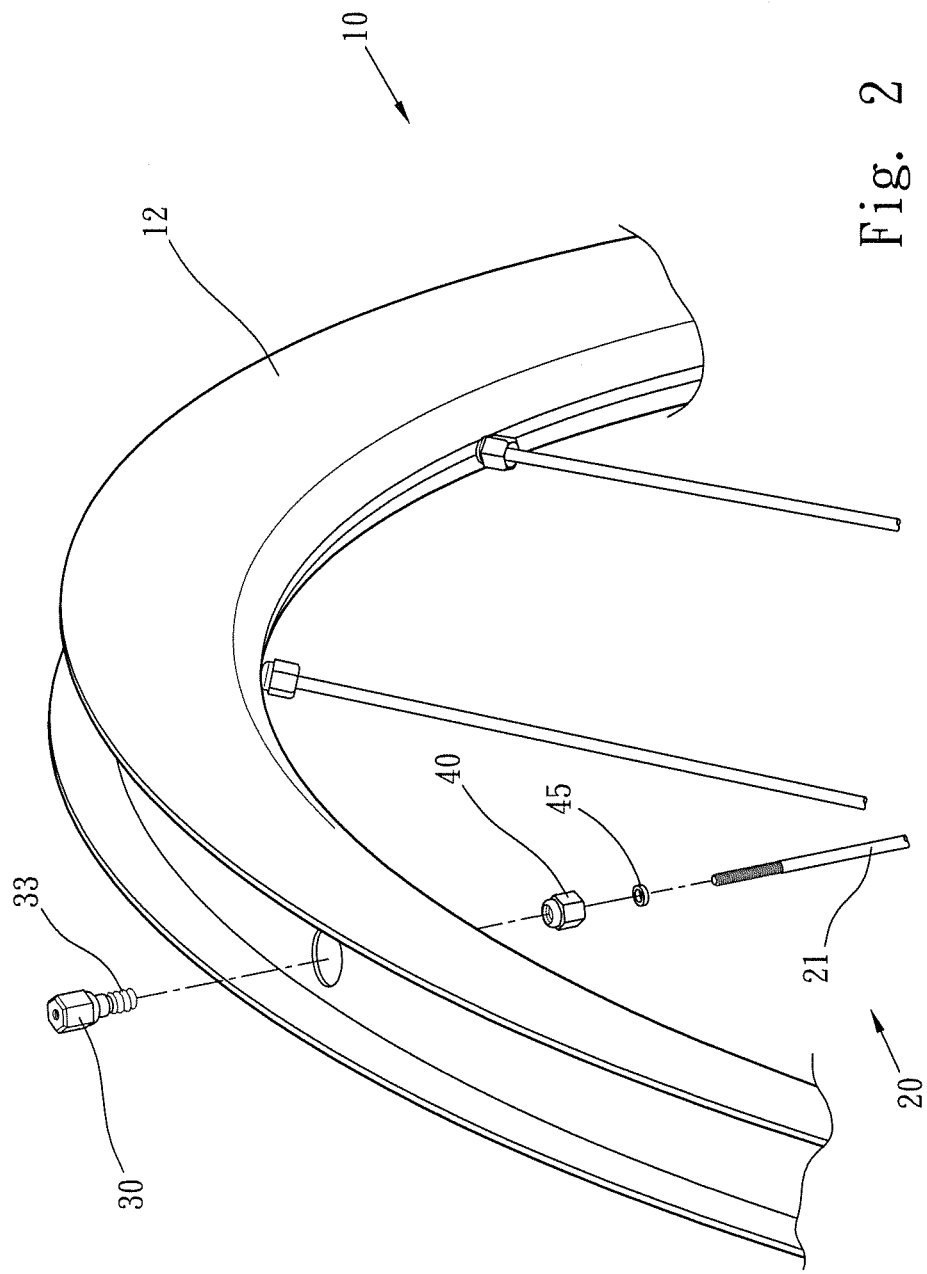
FIG. 2 is a cross sectional view of the securing device of the present invention securing a spoke.
Figure 3:
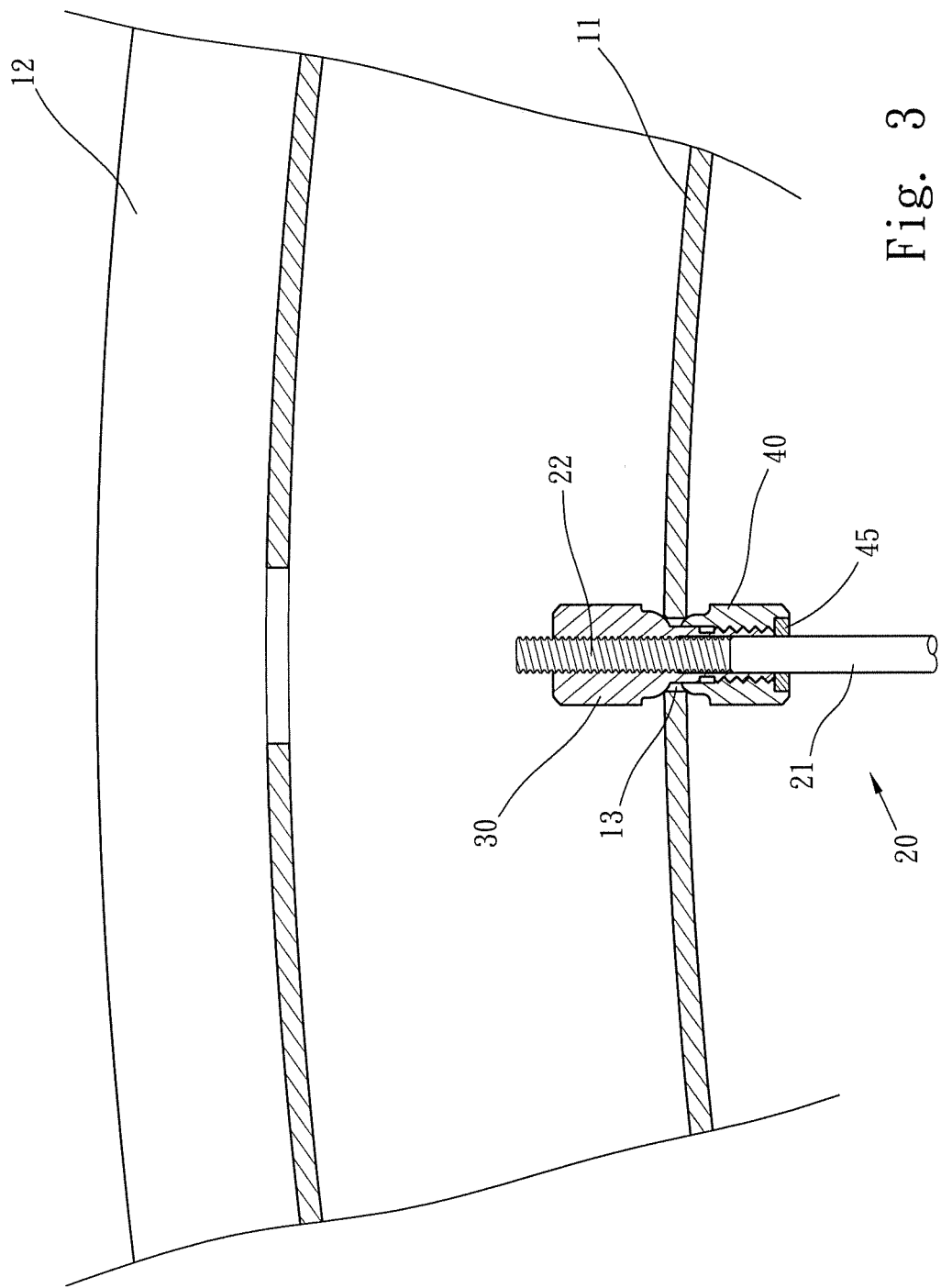
FIG. 3 is an enlarged cross sectional view of the securing device of the present invention securing a spoke.
Figure 4:
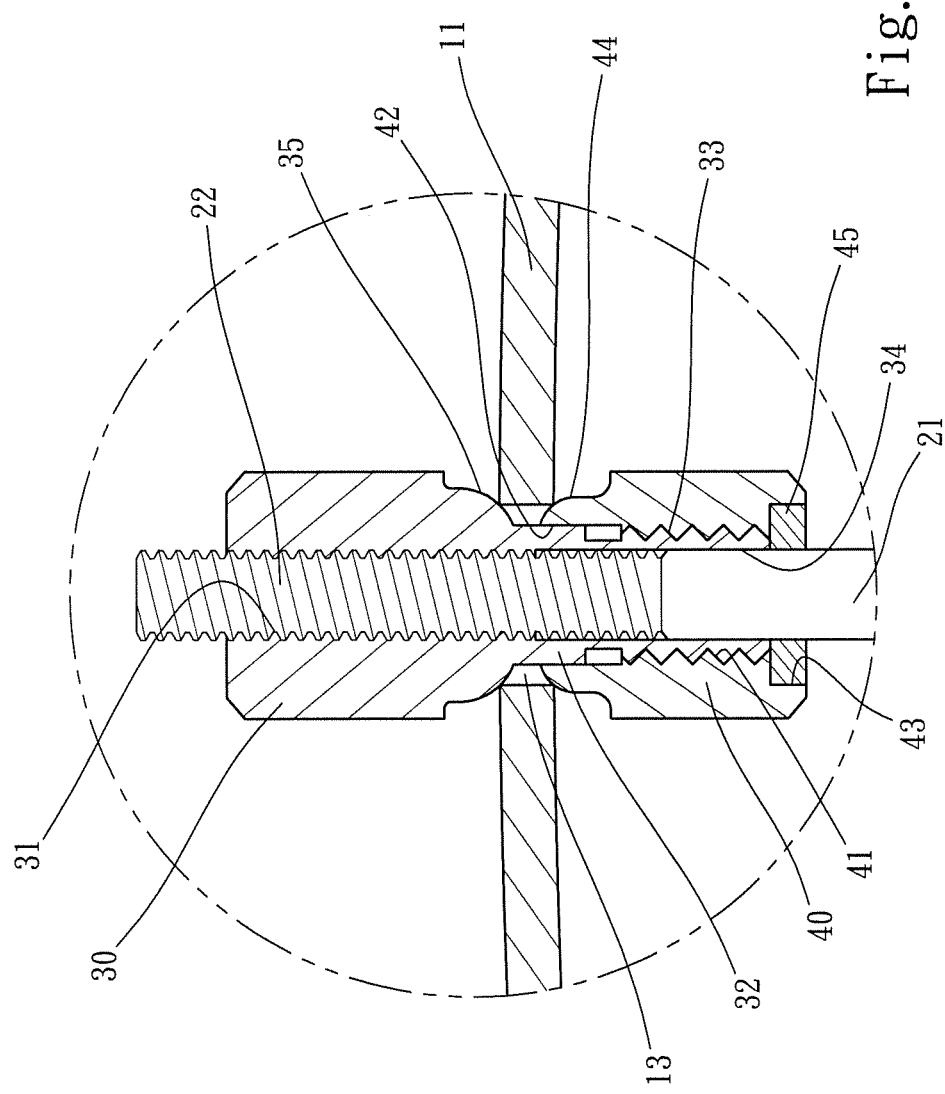
FIG. 4 is an enlarged view of the securing device shown in FIG. 3.

Referring to FIGS. 1 to 4, the securing device for securing a spoke to a rim of the present invention comprises a rim 10 and multiple spoke units 20.

The rim 10 is a U-shaped rim and includes a connection bridge 11 and two walls 12 extend from the connection bridge 11. Multiple installation holes 13 are defined through the connection bridge 11.

Each of the multiple spoke units 20 includes a spoke 21, a first fixing member 30 and a second fixing member 40. Each spoke 21 has a first end connected to a hub and a second end of each spoke 21 has an outer threaded section 22 which extends through the installation hole 13.

The first fixing member 30 is a tubular member and has a first fixing portion 31 which includes inner threads. A second fixing portion 32 and a third fixing portion 33 extend from the first fixing member 30 and are located in opposite to the first fixing portion 31. The third fixing portion 33 has outer threads and the outer threads of the third fixing portion 33 and the outer threaded section 22 of the spoke 21 have opposite threading directions. A passage 34 is defined through the first, second and third fixing portions 31, 32, 33, and the spoke 21 extends through the passage 34. A first guide portion 35 protrudes form the connection portion between the first fixing member 30 and the second fixing portion 32. The second and third fixing portions 32, 33 are located at the inside of the rim 10. The first fixing portion 31 is threadedly connected to the outer threaded section 22 of the first fixing portion 31. The curvature of the curved first guide portion 35 is matched with the installation hole 13 to adjust the angle of the spoke 21 relative to the rim 10.

The second fixing member 40 is a tubular member and mounted to the spoke 21. A connection portion 41 has inner threads defined in the second fixing member 40. A first hole 42 is defined in the first end of the connection portion 41 of the second fixing member 40 and a second hole 43 is defined in the second end of the second fixing member 40. The caliber of the first hole 42 is matched with the second fixing portion 32 so as to guide the first fixing member 30. The connection portion 41 is threadedly connected to the third fixing portion 33. The first fixing portion 32 extends through the first hole 42, so that when the first fixing member 30 is secured, the second fixing member 40 provides guidance to the first fixing member 30 and prevents the first fixing member 30 from being loosened. The second fixing member 40 has a second curved guide portion 44 located around the first hole 42 and the outer shape of the second curved guide portion 44 is matched with the installation hole 13 to adjust the spoke 21 relative to the rim 10. A pad 45 is located in the second hole 43 to keep water out from the first and second fixing members 30, 40, and the pad 45 is located between the third fixing portion 33 and the connection portion 41 to prevent the two parts from being loosened and entry of water.

By the threaded connection between the first fixing member 30 and the spoke 21, the second and third fixing portions 32, 33 on the first fixing member 30, and the second fixing member 40 threadedly connected to the third fixing portion 33, the first fixing member 30 is guided and the second and third fixing portions 32, 33 are reinforced. Therefore, the spokes 21 can be avoided from being broken.

When in assembling, the first fixing member 30 extends through the installation hole 13 in the rim 10, and the second and third fixing portions 32, 33 extend through the installation hole 13 and located at the inside of the rim 10. The spoke 21 extends through the second fixing member 40, the installation hole 13 and the passage 34 of the first fixing member 31. The first fixing portion 31 of the first fixing member 30 is threadedly connected to the outer threaded section 22 of the spoke 21. The first guide portion 35 is installed according the angle of the spoke 21 to be installed. The second fixing member 40 is then connected to the second and third fixing portions 32, 33. The connection portion 41 is threadedly connected to the third fixing portion 33, and the pad 45 is then inserted into the second hole 43.

When adjusting or replacing the first fixing member 30, the second fixing member 40 is first loosened and the first fixing member 30 is then loosened to adjust or replace the spoke 21.

The first fixing member 30 is guided and secured by connecting the second fixing member 40 and the first fixing member 30, and by connection of the fixing member 40 and the third fixing portion 33. The second fixing member 40 reinforces the second and third fixing portions 32, 33 to prevent the spoke 21 from being broken.

The outer threads of the third fixing portion 33 and the outer threaded section 22 of the spoke 21 have opposite threading directions so that when the first fixing member 30 is loosened, the second fixing member 40 is secured to prevent the first fixing member 30 from being loosened. The pad 45 is located in the second hole 43 to keep water out from the first and second fixing members 30, 40, and the pad 45 is located between the third fixing portion 33 and the connection portion 41 to prevent the two parts from being loosened and entry of water.

While we have shown and described the embodiment in accordance with the present invention, it should be clear to those skilled in the art that further embodiments may be made without departing from the scope of the present invention.

What is claimed is:

1. A securing device of a wheel rim comprising:
   a rim having a connection bridge and two walls extending from the connection bridge, multiple installation holes defined through the connection bridge;
   multiple spoke units and each spoke unit having a spoke, a first fixing member, and a second fixing member detachably coupled to the first fixing member, each spoke having a first end adapted to be connected to a hub and a second end having an outer threaded section extending through the installation hole, the first fixing member being a tubular member and including:
   a first fixing portion defining inner threads, the first fixing portion being threadedly connected to the outer threaded section of the spoke;
   a second fixing portion and a third fixing portion formed on the first fixing member opposite to the first fixing portion, the third fixing portion having outer threads, a passage defined through the first, second and third fixing portions;
   wherein the spoke extends through the passage, the second fixing member being a tubular member and mounted to the spoke, the second fixing member including a connection portion having inner threads threadedly connected to the third fixing portion; and,
   wherein the first and second fixing members adjustably capture a portion of the connection bridge therebetween for securement of the first and second fixing members to the rim, and at least one of the first and second fixing members includes a guide portion defining a curved surface seated on an installation hole of the connection bridge in angularly adjustable manner.

2. The device as claimed in claim 1, wherein the outer threads of the third fixing portion and the outer threaded section of the spoke have opposite threading directions.

3. The device as claimed in claim 1, wherein the first fixing member extends through the installation hole of the rim, the second and third fixing portions being at least partially disposed radially within the rim.

4. The device as claimed in claim 1, wherein a first hole is defined in a first end of the connection portion of the second fixing member and a second hole is defined in a second end of the second fixing member, a caliber of the first hole is matched with the second fixing portion so as to guide the first fixing member.

5. The device as claimed in claim 1, wherein a first hole is defined in a first end of the connection portion of the second fixing member and a second hole is defined in a second end of the second fixing member, the first fixing portion extends through the first hole and a pad is located in the second hole.

6. The device as claimed in claim 1, wherein the second fixing member has a curved guide portion whose outer shape is matched with the installation hole to adjust the spoke relative to the rim.

7. The device as claimed in claim 1, wherein each of the first and second fixing members includes the guide portion.

* * * * *